US005613828A

United States Patent [19]

Haddow et al.

[11] Patent Number: 5,613,828

[45] Date of Patent: Mar. 25, 1997

[54] HANDLING PARTLY COMPLETED CONTAINERS

[75] Inventors: Philip G. Haddow, Coventry; Roderick L. Mitchell, Leicestershire; David R. Seaward, Birmingham; Geoffrey W. Vernon, Buckinghamshire, all of England

[73] Assignee: Thomas J. Lipton Co., Division of Conopco, Inc., Englewood Cliffs, N.J.

[21] Appl. No.: 503,752

[22] Filed: Jul. 18, 1995

[30] Foreign Application Priority Data

Jul. 19, 1994 [EP] European Pat. Off. .............. 94305288

[51] Int. Cl.$^6$ .................................................... B65G 57/00

[52] U.S. Cl. .......................... 414/798.9; 493/315; 53/564

[58] Field of Search ................................ 414/797, 798.9; 53/564, 565, 566; 493/315, 316, 317; 198/803.13, 484.1

[56] References Cited

U.S. PATENT DOCUMENTS

| | | | |
|---|---|---|---|
| 2,146,615 | 2/1939 | Bishop | 198/803.13 |
| 3,198,316 | 8/1965 | Bivans | 198/484.1 |
| 3,242,827 | 3/1966 | Winters . | |
| 3,564,980 | 2/1971 | Winters | 493/317 |
| 3,783,752 | 1/1974 | Langen et al. | 493/316 |
| 4,061,081 | 12/1977 | Pinto et al. . | |
| 4,232,591 | 11/1980 | Karpinsky | 493/316 |
| 4,605,393 | 8/1986 | Krieger et al. | 493/317 |
| 4,787,881 | 11/1988 | Andersson et al. | 493/316 |
| 5,061,231 | 10/1991 | Dietrich et al. | 493/317 |
| 5,207,630 | 5/1993 | Decker et al. | 493/315 |
| 5,415,615 | 5/1995 | Culpepper | 493/315 |

FOREIGN PATENT DOCUMENTS

| | | |
|---|---|---|
| 0434961 | 7/1991 | European Pat. Off. . |
| 0461084 | 12/1991 | European Pat. Off. . |
| 2493806 | 5/1982 | France . |
| 3010891 | 10/1981 | Germany . |

*Primary Examiner*—Karen B. Merritt
*Assistant Examiner*—Douglas Hess
*Attorney, Agent, or Firm*—James J. Farrell

[57] ABSTRACT

Successive flat skillets (S) are picked from a stack (12) and fed to a conveyor (2) by a mechanism which has devices gripping adjacent side faces to a fold line of a skillet to open the skillets to their tubular form during the transfer movement. The gripping devices (22,24) pivot on an axis coincident with the skillet fold line to allow the skillet to be opened to its full tubular form without distortion. The mechanism is so arranged that the skillet reservoir stack (12) can be oriented in a plane substantially parallel to the conveyor path for the opened skillets, in order to minimize space requirements.

18 Claims, 6 Drawing Sheets

HANDLING PARTLY COMPLETED CONTAINERS

BACKGROUND OF THE INVENTION

This invention relates to apparatus for use in container erection installations, for handling partly completed containers in the form of skillets, and to methods of handling partly formed containers.

Polygonal containers, e.g. made from paper or board, are commonly made by cutting blanks from the sheet material, with impressed fold lines. The blanks are erected by folding the main body to form a polygonal tube which is closed by a glued seam along one longitudinal edge. This tubular form of blank is known as a skillet. Subsequently, integral flaps and tabs at both ends of the blank are folded over and glued as necessary to close the ends of the container. Before the container is fully closed, it may be filled with its intended contents.

If the containers are to be machine-filled, they may be supplied partly formed to the filling installation, as flattened tubular blanks or skillets. For example, EP 461084A describes an apparatus in which flattened tubular blanks or skillets are drawn from a reservoir stack by a swinging arm to be placed on a conveyor belt. The skillets are partly opened by a stationary guide as they move between reservoir and container and in order to place them at the required locations the conveyor belt is stationary during the transfer movement. When the conveyor belt is restarted temporary holding means shapes the tubular form further. The skillet achieves its final rectangular tubular form only when it reaches a second conveyor belt opposite the first belt, as it is brought between locating means on both belts.

DE 3010891 describes another skillet supply arrangement in which a swinging arm moves the skillets from reservoir stack to a conveyor. A suction device is articulated on the arm and moves onto the skillet drawn from the stack to begin to open the skillet as it moves towards the conveyor. In order to do this it is required to pivot on the arm about a centre some distance from the skillet and a large angular movement of the device will therefore either distort the skillet or will result in device slipping and its suction grip being lost. The arrangement described in fact also proposes the use of a stationary guide to complete the opening of the skillets, which makes a large angular movement of the suction device unnecessary.

Both these known arrangements have the further disadvantage that the skillet stack protrudes transversely to the conveyor path. This can increase the overall space requirements of the installation comprising the reservoir stack and conveyor. In both instances, furthermore, the swinging arm is brought between the conveyor and the skillet as it deposits the opened skillet in the conveyor. There must therefore be a pause while the conveyor moves the deposited skillet onwards before the arm can return to the stack. The need to provide clearance for the arm between the skillet and the conveyor may also impose constraints on the design of the conveyor.

SUMMARY OF THE INVENTION

According to one aspect of the present invention, an apparatus is provided comprising means for transferring successive flat skillets from a stack to conveying means, said transfer means being provided with respective devices for gripping peripherally spaced regions of each skillet to open the skillet to at least substantially the tubular cross-sectional form of the container in the course of transferring the skillets to the conveyor, the transfer means comprising pivot means for relative displacement of said devices about a common pivot axis that is substantially coincident with a fold line of each skillet.

With this arrangement of gripping devices, it is possible to engage two adjacent faces of a flat skillet, e.g. for a rectangular container, and open it out fully while it remains securely held and while avoiding risk of damage to the skillet from shearing forces generated during the opening movement.

According to another aspect of the invention, apparatus is provided comprising means for transferring successive flat skillets from a stack to a conveyor while opening said skillets to at least substantially their final tubular cross-sectional form, said conveyor providing a generally linear travel direction for the opened skillets transferred thereto, said transfer means being provided with respective devices for gripping peripherally spaced regions of each skillet for the opening movement, said transfer means defining a travel path for the skillets moving through an angle, said path adjacent the skillet stack running in a plane substantially parallel to the conveyor travel direction and, adjacent the conveyor, running substantially perpendicular to the conveyor travel direction.

The skillet stack can thus be placed so that its axis extends in a plane generally parallel to the conveyor track. In particular, when the opened skillets are to be conveyed upright the stack can have a minimum lateral projection from the plan area of the conveyor so that it does not require substantial additional floor space. Furthermore, this configuration facilitates an arrangement of the transfer means so that they remain on the outer side of the opened skillets relative to the conveyor, so allowing the transfer means to be retracted immediately a skillet has been placed in the conveyor.

The invention will be described by way of example with reference to the accompanying drawings.

DESCRIPTION OF THE PREFERRED EMBODIMENT

Figure 1:
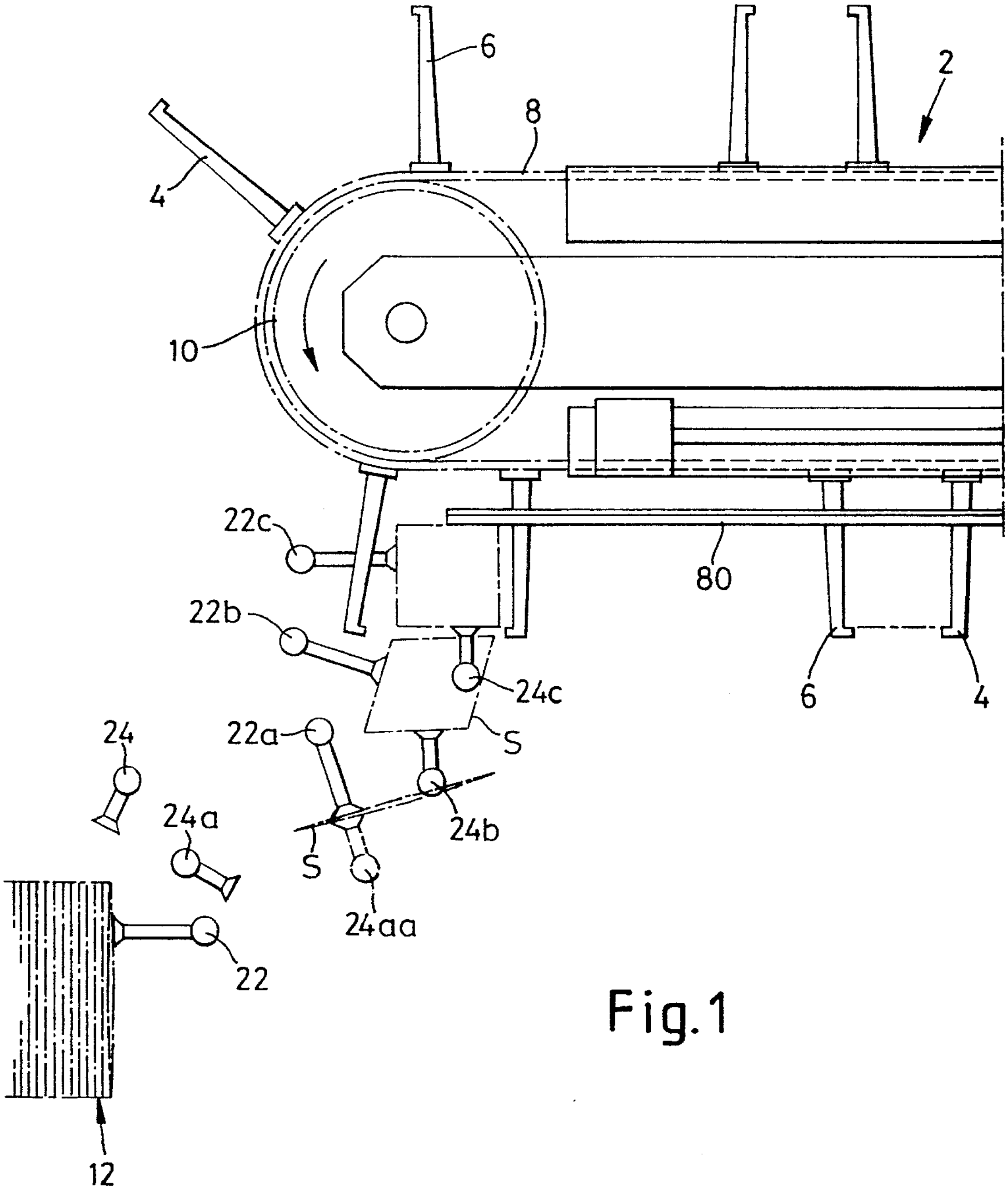
FIG. 1 is a plan view of a part of a container handling installation illustrating the use of transfer means according to the present invention to feed a series of tubular blanks or skillets to holding means on a conveyor.

FIG. 1 illustrates a conveyor 2 which has flight bars 4,6 projecting perpendicularly from respective continuous bands 8 running around end pulleys 10, one end only of the conveyor being shown. The flight bars are arranged in groups of at least two bars to grip skillets or containers by their front and rear faces, the number of flight bars in a group and their form depending on the shape of the containers. For example, for tall rectangular cross-section containers there may be three flight bars in each group with one leading bar 4 and two trailing bars 6 disposed at levels above and below the leading bar 4 so as to hold a container stably.

Skillets S, that is to say carton blanks which have already been folded over and had their opposite side edges glued together ready to be opened in the form of a tube, in this example of rectangular cross-section, are held in flattened form in a reservoir stack 12. The flat skillets are removed successively and are opened into their tubular form as they are transferred to the conveyor to be entrained by the flight bars 4,6.

Figure 2:
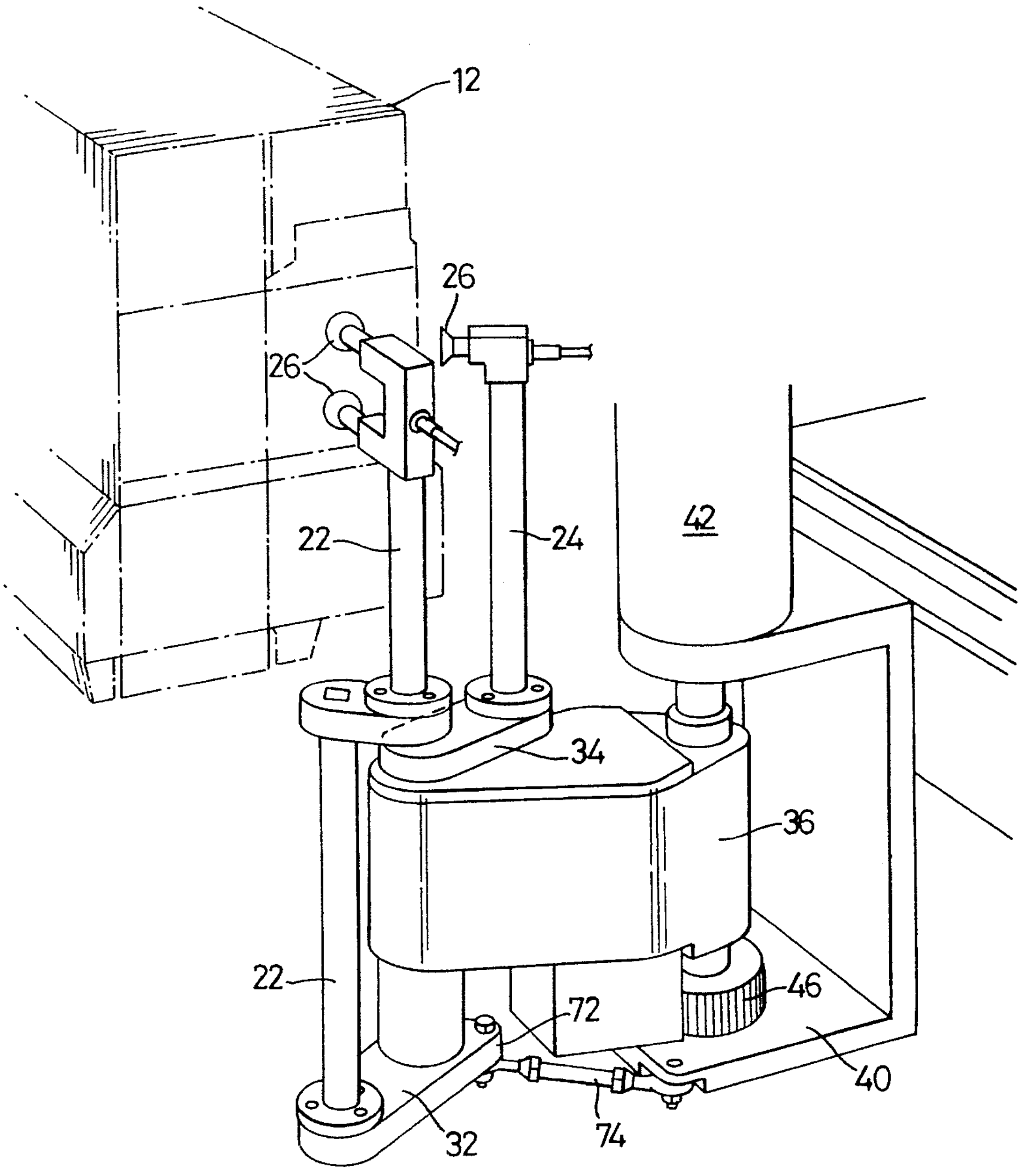
FIG. 2 is a perspective view of the transfer means feeding the skillets in FIG. 1, showing it at the position for extracting a flat skillet from a stack.
Figure 3:
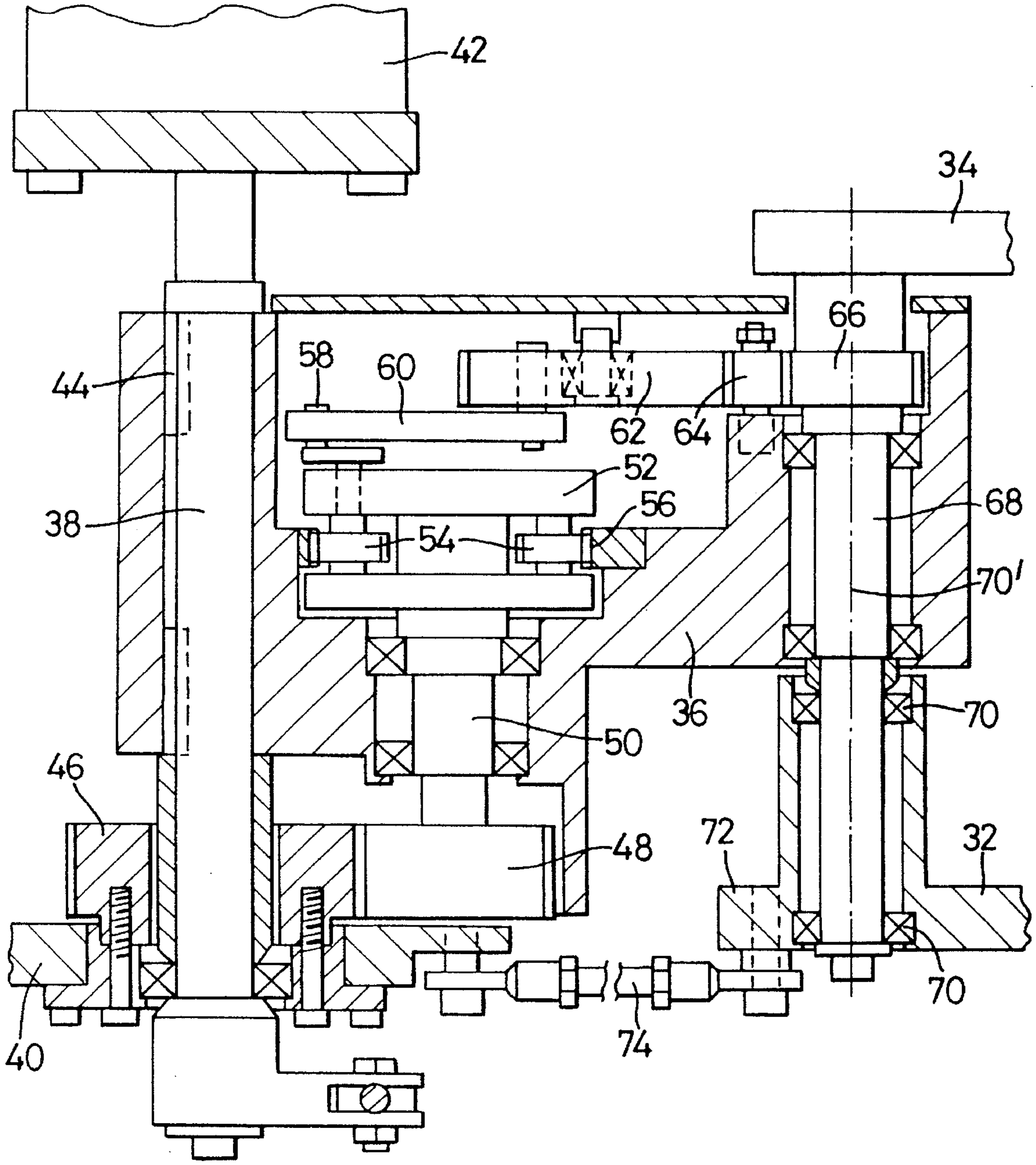
FIG. 3 is a sectional elevation illustrating the mechanism within the casing of the transfer means.

FIG. 1 illustrates the skillets S at successive stages of the transfer process. The transfer means comprises two vertical columns 22,24 provided with suction cups 26 (FIG. 2) at their upper ends connectable to a vacuum line (not shown) through conduits (not shown) in the columns. The first column 22 carries a pair of vertically spaced suction cups 26 and the second column 24 carries a single suction cup 26 at a height between those of the suction cups on the first column 22. The columns are mounted on respective crank arms 32,34 which are pivoted in a casing 36 which houses part of the mechanism controlling the movement of the columns. The casing is itself mounted on a vertical shaft 38 (FIG. 3) rotatably held in a bracket 40 secured to the conveyor base frame. The shaft 38 is rotated by an electric motor 42 supported on the bracket 40 and the casing is fixed to the shaft by a key 44 to pivot with it.

At the lower end of the shaft a first gear wheel 46 fixed to the bracket 40 projects into the casing. A meshing second gear wheel 48 is rotatably mounted in the casing 36 by a shaft 50 on the upper end of which is a planet carrier 52 of an epicyclic gear. The epicyclic gear further comprises a series of three planet wheels 54 spaced around the carrier 52 engaging a ring gear 56 fixed to the casing. The supporting shaft of one of the planet wheels comprises a crank 58 to which is pinned one end of a link 60. The other end of the link 60 is pinned to a gearwheel 62 eccentrically to its rotary axis. The gearwheel 62 is first of a train of three gearwheels 62,64,66 the last of which is secured to a pivot shaft 68 journalled in the casing and carrying the crank arm 34.

The crank arm 32 is supported on the lower end of the pivot shaft 68 by bearings 70 so that the shaft 68 defines the common vertical axis 70' about which the two crank arms 32,34 pivot separately.

The crank arm 32 has a second limb 72 which is connected through a link 74 to the bracket 40. The crank arm 32, casing 36 and link 74 thereby form with the stationary bracket 40 a four-bar linkage which is driven by the motor 42 pivoting the casing about the motor shaft axis. The same pivoting of the motor shaft 38 and casing 36 causes rotation of the second gear 48 as it travels around the fixed first gear 46 and so causes the planet carrier 52 to rotate. Because the planet wheels 54 are engaged with the ring gear 56 fixed to the casing, they are rotated by the movement of their carrier. The crank 58 is driven by a combination of the motions of the carrier 52 and its planet wheel 54, so rotating the gear train 62,64,66 to pivot the crank arm 34.

In the cycle of operation the two crank arms 32,34 carry out coordinated movements generated by the rotation of the motor shaft through an angle of some 100° to displace the columns 22,24 between the skillet stack and the conveyor.

Figure 4:
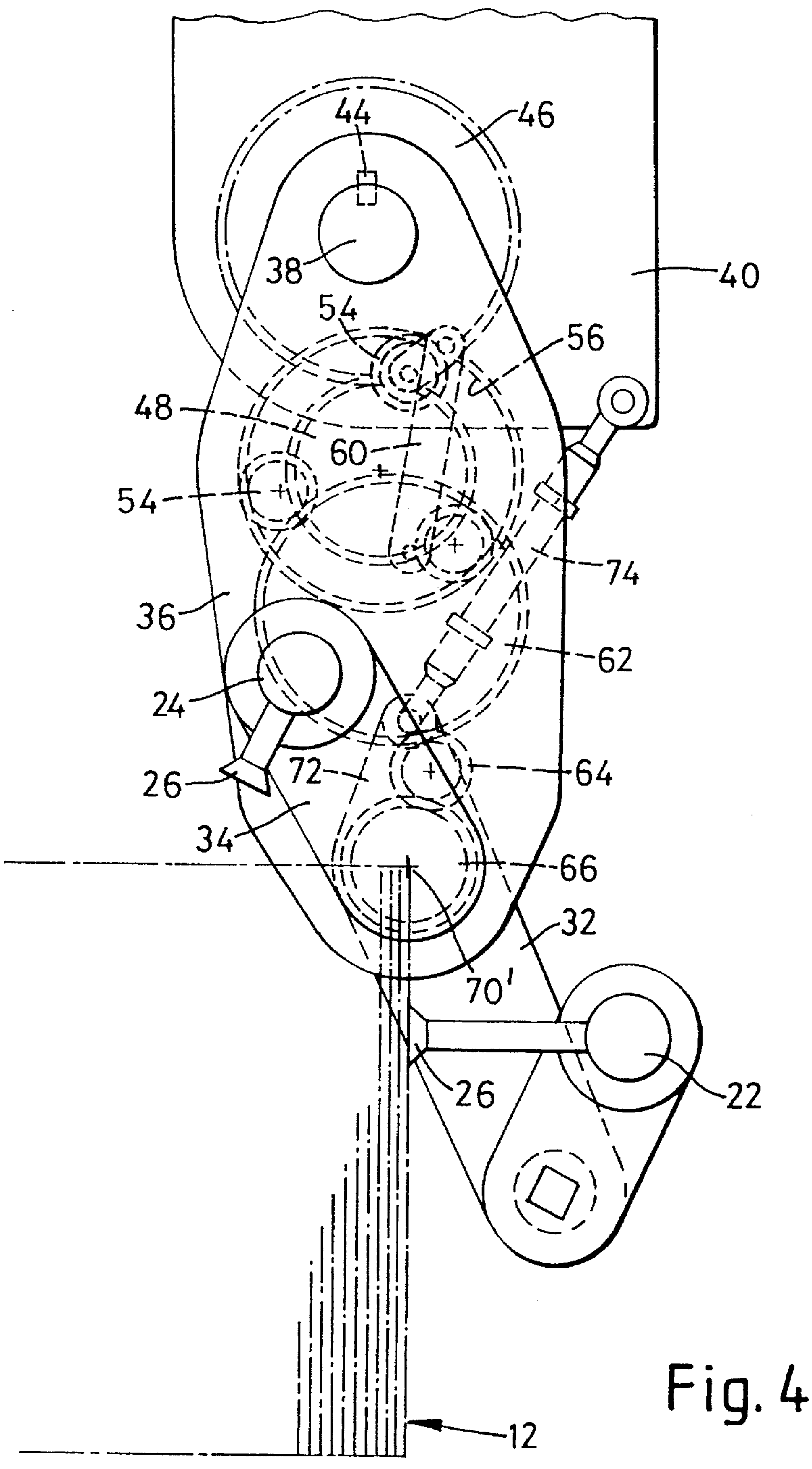
FIGS. 4 to 6 are plan views of the transfer means showing successive stages of its operational cycle.

When the mechanism is at the start of a cycle, in the position shown in FIG. 4 the two suction cups 26 of the first column 22 are placed against the leading skillet in the stack 12 and the second column 24 is held some distance from the stack. The common vertical pivot axis 70' of the crank arms 32,34 is co-incident with a folded edge of the frontmost skillet. The casing 36 is now rotated anti-clockwise (as seen in FIG. 4) while a vacuum is applied to the suction cups on the first column 22 to extract the contacted skillet from the stack, still in a flattened state, this initial movement being axially of the stack and generally parallel to the conveyor path.

The movement of the first arm as the cycle begins takes place with the pivot centres of the casing 36 and the crank arm 32 nearly in line, so that there is little rotation of the column 22 about the axis 70' as it moves away from the stack, but the presence of the link 74 soon generates an anti-clockwise pivoting about the axis 70' as seen in FIG. 4. The gear drive to the second crank arm 34 is also operative is the motor shaft begins to rotate but the initial orientation of the link 60 is such that there is little rotation transmitted from the planet crank 58 to pivot the second crank arm and that occurs in the reverse sense, keeping the column 24 clear of the skillet stack.

As the movement of the motor shaft is maintained the changing orientation of the link 60 together with the overall ratio of the gear mechanism within the casing causes a rapid pivoting of the second crank arm 34, as indicated by the second column position **24*a* in FIG. 1. This pivoting of the second column is continued until it comes directly opposite the first column with the still flat skillet between the columns. The positions of the columns at this stage of the cycle are indicated at 22*a* and 24*aa* in FIG. 1**.

Figure 5:
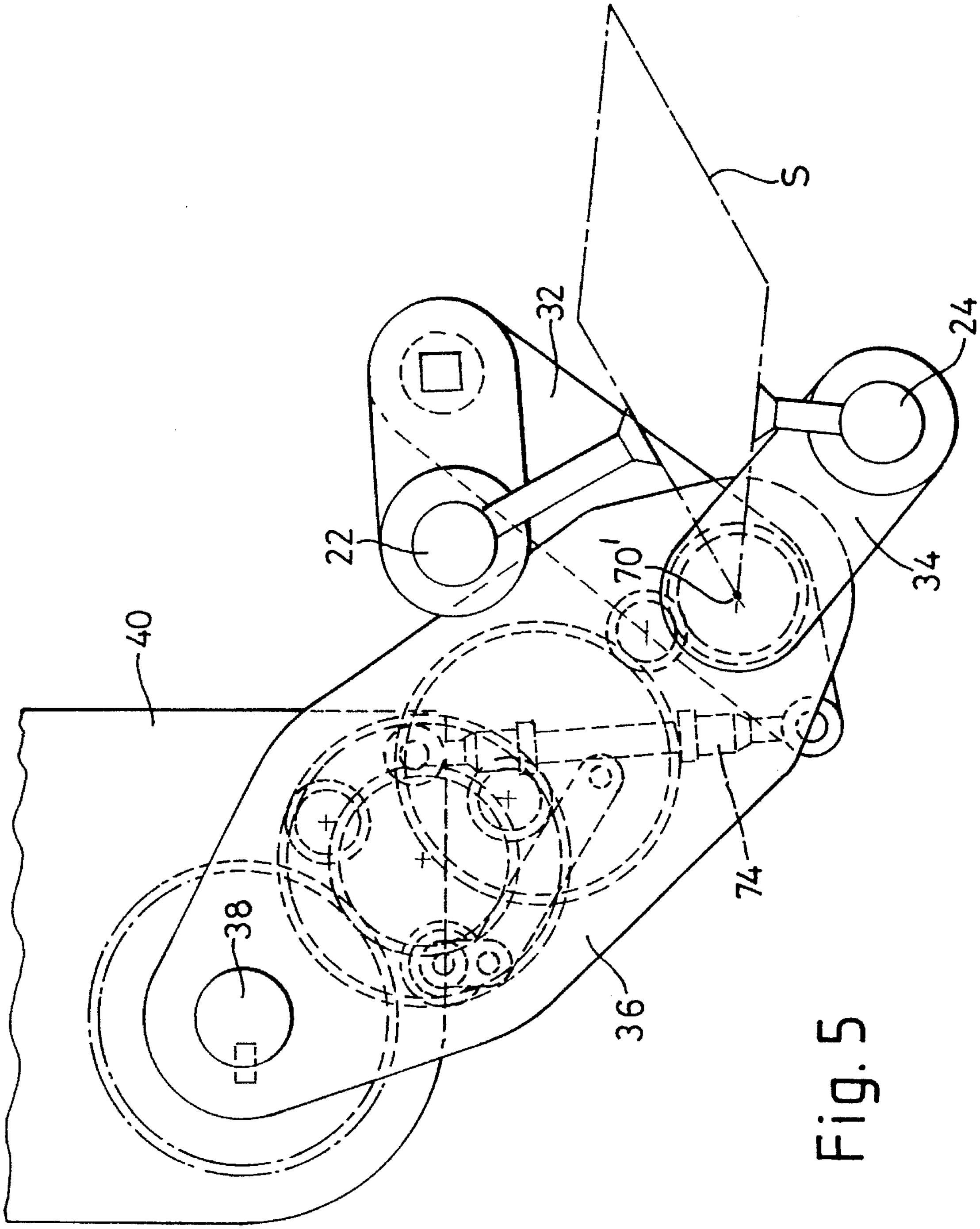
Figure 6:
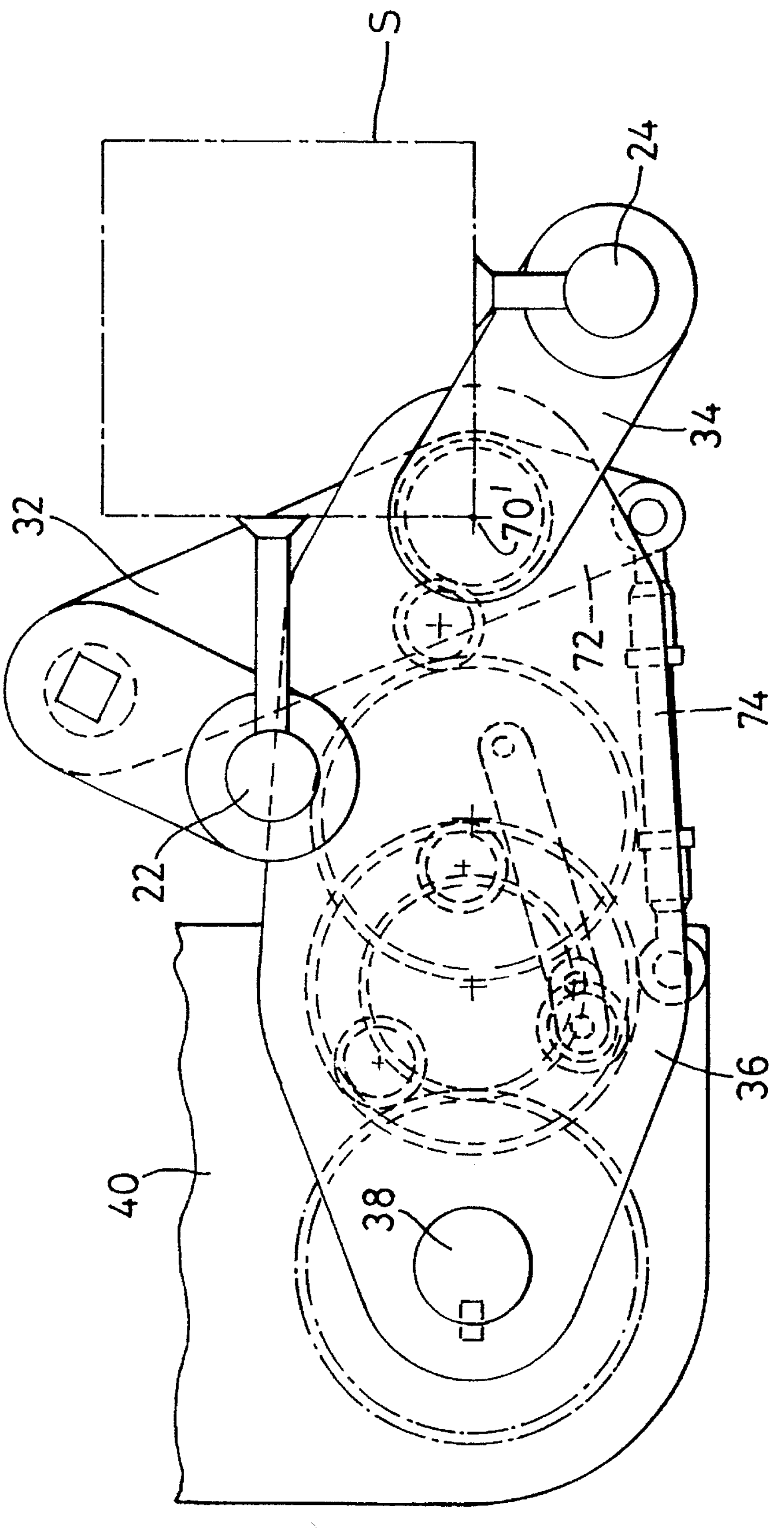

At this point a vacuum is applied through the column 24 to cause its suction cup to grip the skillet. Two opposite surfaces of the skillet extending from the fold line aligned with the axis 70' are now held by the suction cups of the respective columns 22,24. In the following part of the cycle, the rotation of the column 24 is reversed while the continued pivoting of the casing 36 advances the skillet towards the conveyor. By this movement the flat skillet is opened out into a diamond shape, as indicated in FIG. 5. Because the relative movement of the crank arms takes place on the common vertical axis 70' which coincides with a fold line of the skillet, pivoting the skillet open does not impose any distortions on it. The mechanism can operate on different sizes of skillet with equal facility if this condition is maintained.

The resultant movement is of both crank arms 32,34 slow towards the end of the transfer movement as the now opened skillet arrives at the conveyor 2 in synchronism with a group of flight bars, and is inserted between the leading and trailing bars 4,6 of the group (column positions **22*c*,24*c***) during a pause in the movement of the conveyor. At this stage, there is little or no relative pivoting movement between the crank arms. The skillets therefore move essentially perpendicular to the conveyor path as they enter between the flight bars.

The delivery position of the skillets is immediately adjacent the return pulleys at the conveyor entry end. Because the flight bars are fixed perpendicular to their conveyor bands, the leading and trailing bars of a group travelling around this region diverge from each other with the curvature of the conveyor path. The opened skillet is delivered between the flight bars while they are still in divergent positions so that their wider spacing leaves a clearance for the skillet, as can be seen in FIG. 1. With the next step of the conveyor movement the trailing flight bars capture the skillets as they become parallel to the forward bar and the skillet is gripped by the group of bars.

The skillet is now held vertically by the flight bars as it is progressed by the conveyor through a series of operating stations (not shown) where the carton is completed and filled.

Simultaneously with the engagement of the skillet by the conveyor flight bars, the vacuum is cut off from the suction cups 26 and the movement of the motor 42 is reversed to begin the return movement. The reservoir stack has meanwhile been advanced forwards by an indexing mechanism (not shown) to present a further skillet so that the cycle can be repeated.

The flight bars have hook-like projections 4*a*,6*a* at their free ends which provide engagements for a side face of the skillets. A fixed rail 80 forms a guide for the opposite side of the skillets so that they are fully located as they travel along the conveyor. This, with the parallelism of the opposed faces of the forward and rearward flight bars, ensures that the skillets are held in their fully opened rectangular plan form.

The illustrated example can be modified in many ways within the scope of the intention. For example, although it is described how the opened skillets are gripped by the conveyor holding members after they have been placed between the holding members in a stationary phase of the conveyor, it is possible to arrange that the skillets are transferred while the conveyor is in continuous movement, which can assist in achieving relatively high throughput rates.

The relative movements of the flight bars to grip the containers is not necessarily dependent on the form of the conveyor path, as dictated by the return pulleys 10 in the apparatus illustrated. It is possible, as another example, to provide cam means to generate these movements so that they can occur along a linear section of the conveyor path.

We claim:

1. Apparatus for handling skillets, comprising means for transferring successive flat skillets from a stack of said skillets to conveying means, said transfer means comprising a first gripping device for gripping an exposed face of a skillet in the stack for removing said skillet from the stack, and a second gripping device for gripping a face of said skillet opposite said exposed face after removal of the skillet from the stack and control means for relative displacement of said first and second gripping devices to open the skillet to at least substantially a tubular cross-sectional form of a completed container while transferring the skillet to the conveying means, said control means comprising pivot means for relative displacement of said first and second devices about a common pivot axis that is substantially coincident with a fold line of the gripped skillet.

2. Apparatus according to claim 1 comprising a common drive means for said gripping devices.

3. Apparatus according to claim 2 wherein the drive means comprises a pivoting drive member and pivot mounting means are provided on said drive member, said first and second gripping devices being each pivotably supported by said mounting means to be displaceable relative to each other.

4. Apparatus according to claim 3 wherein a gear mechanism is carried by the drive member for the pivoting of one of said devices.

5. Apparatus according to claim 1 wherein the second said gripping device is pivotally mounted for pivoting to a substantially opposed position to said first device after the skillet has been extracted in order to grip said face opposite to said exposed face gripped by the first device.

6. Apparatus according to claim 1 wherein said transfer means are arranged to displace the opened skillets on a path substantially perpendicular to a travel path of the conveying means as the skillets come close to said path.

7. Apparatus according to claim 6 wherein the transfer means are arranged to displace the skillets adjacent the skillet stack on a path that lies substantially in a plane parallel to the conveying means travel path.

8. Apparatus according to claim 1 wherein the conveying means comprises a conveyor having front and rear members for closing upon the opened skillet inserted between them to grip opposite sides of the skillet after said transfer means have inserted the opened skillet.

9. Apparatus according to claim 8 wherein said front and real members extend from the conveyor and have distal ends; elements on said distal ends projecting from said front and rear members for providing a location for a side of the opened skillet between the opposite sides of the opened skillet gripped by the members.

10. Apparatus according to claim 1 wherein said transfer means comprises a mechanism for pivoting the skillets during the transfer from the stack to the conveying means, said exposed face thereby being given a final orientation at the end of the transfer movement substantially opposite to an initial orientation of said face when said skillet leaves the stack.

11. Apparatus for handling skillets, comprising means for transferring successive fiat skillets from a stack of said skillets to conveying means while opening said skillets to at least substantially a tubular cross-sectional form of a completed container, said conveying means providing a generally linear travel direction for the opened skillets transferred thereto, said transfer means having respective devices for gripping a plurality of peripherally spaced regions of each skillet for said opening of successive skillets during their transfer to the conveying means, a travel path being defined by the transfer means for the skillets, said travel path describing an angle wherein said path adjacent the skillet stack runs in a plane substantially parallel to said conveying means travel direction for the opened skillets and, wherein said travel path adjacent to the conveyor, runs in a plane substantially perpendicular to said conveying means travel direction.

12. Apparatus according to claim 11 wherein the transfer means comprises gripping devices for engagement with opposite sides of a skillet extending from a side edge fold, and control means acting on said devices for opening the skillet out into a tubular form as it is moved by said gripping devices along a portion of the travel path spaced from the stack.

13. Apparatus according to claim 12 wherein said control means act on the gripping devices to bring said opposite sides of the skillet into substantially perpendicular relationship to each other.

14. Apparatus according to claim 11 wherein the conveying means comprises a conveyor having front and rear members for closing upon the opened skillet inserted between said front and rear members to grip opposite sides of the skillet after said transfer means have placed the opened skillet between said members.

15. Apparatus according to claim 14 wherein said front and rear members extend from the conveyor and have distal ends, elements on said distal ends projecting from said front and rear members for providing a location for a side of the opened skillet between the opposite sides of the opened skillet gripped by the members.

16. Apparatus for handling skillets, comprising means for transferring successive flat skillets from a stack of said skillets to conveying means, said transfer means comprising a first gripping device for gripping an exposed face of a skillet in the stack for removing said skillet from the stack, and a second gripping device for gripping a face of said skillet opposite said exposed face after removal of the skillet from the stack, a common drive means for driving said gripping devices comprising a pivoting drive member, pivot mounting means on said drive member, said first and second gripping devices being each pivotably supported by said mounting means to be displaceable relative to each other, control means for relative displacement of said first and second gripping devices to open the skillet to at least substantially a tubular cross-sectional form of a completed container while operating said common drive means to transfer the skillet to the conveying means, said control means comprising pivot means for relative displacement of said first and second devices about a common pivot axis that is substantially coincident with a fold line of the gripped skillet.

17. Apparatus for handling skillets, comprising means for transferring successive flat skillets from a stack of said skillets to conveying means while opening the skillets, the conveying means comprising a conveyor having front and rear members for closing upon an opened skillet inserted between them, said transfer means comprising a first gripping device for gripping an exposed face of a skillet in the stack for removing said skillet from the stack, and a second gripping device for gripping a face of said skillet opposite said exposed face after removal of the skillet from the stack and control means for relative displacement of said first and second gripping devices to open the skillet to at least substantially a tubular cross-sectional form of a completed container while transferring the skillet to the conveying means to insert the skillet between said front and rear members, said front and rear members extending from the conveyor and having distal ends, elements on said distal ends projecting from said front and rear members for providing a location for a side of the opened skillet between the opposite sides of the opened skillet gripped by the members, said control means for the gripping devices comprising pivot means for said relative displacement of said first and second devices about a common pivot axis that is substantially coincident with a fold line of the gripped skillet.

18. Apparatus for handling skillets, comprising means for transferring successive flat skillets from a stack of said skillets to conveying means while opening said skillets to at least substantially a tubular cross-sectional form of a completed container, said conveying means comprising a conveyor providing a generally linear travel direction for the opened skillets transferred thereto, at least one group of front and rear members extending from the conveyor for closing upon an opened skillet inserted between said front and rear members to grip opposite sides of the skillet after said transfer means have placed the opened skillet between said members, said front and rear members having distal ends and elements on said distal ends projecting from said front and rear members for providing a location for a side of the opened skillet between the opposite sides of the opened skillet gripped by the members, said transfer means having respective devices for gripping a plurality of peripherally spaced regions of each skillet for said opening of successive skillets during their transfer to the conveying means, a travel path being defined by the transfer means for the skillets, said travel path describing an angle wherein said path adjacent the skillet stack runs in a plane substantially parallel to said conveying means travel direction for the opened skillets and, wherein said travel path adjacent the conveyor, runs in a plane substantially perpendicular to said conveying means travel direction.

* * * * *